Nov. 9, 1926.
C. A. FISHER
1,606,356
LIQUID PURIFICATION AND LIQUID LEVEL CONTROL
Filed Oct. 6, 1924    2 Sheets-Sheet 1
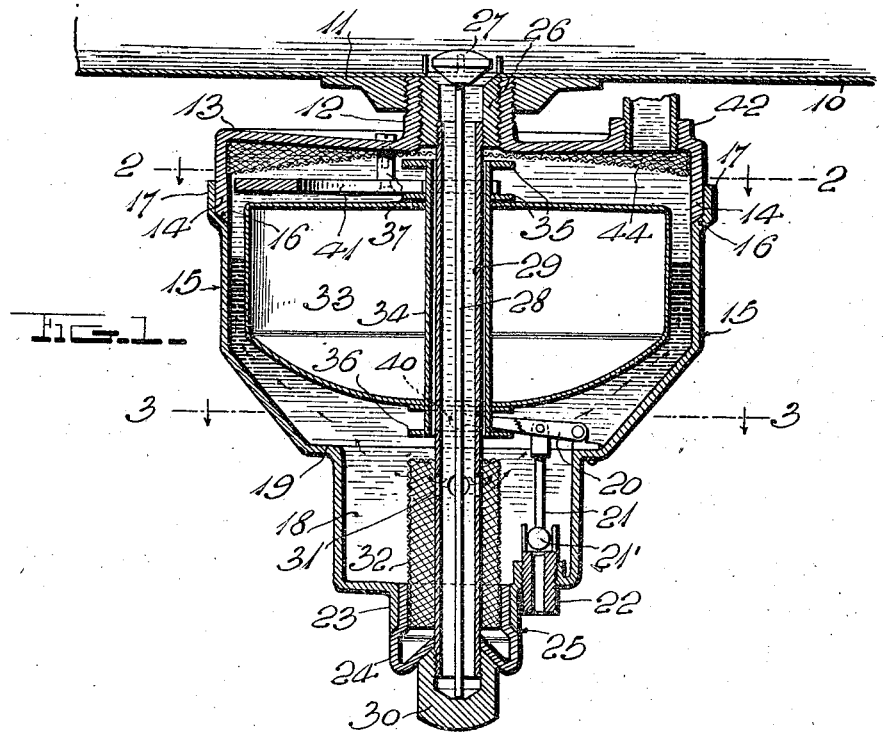
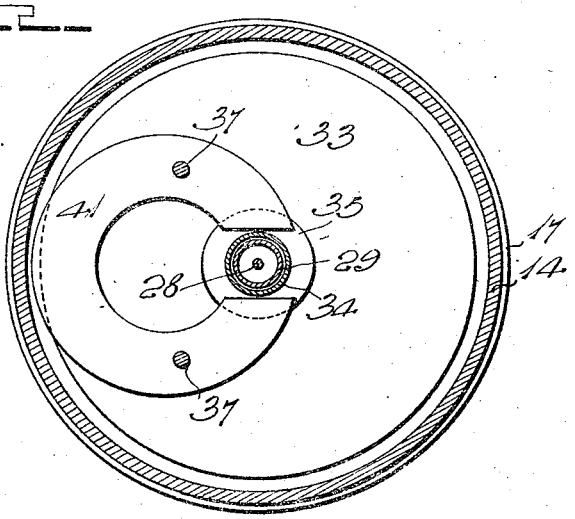
INVENTOR:
CHARLES A. FISHER,
BY *A. E. Woodward*
ATTORNEY Nov. 9, 1926.
C. A. FISHER
1,606,356
LIQUID PURIFICATION AND LIQUID LEVEL CONTROL
Filed Oct. 6, 1924   2 Sheets-Sheet 2
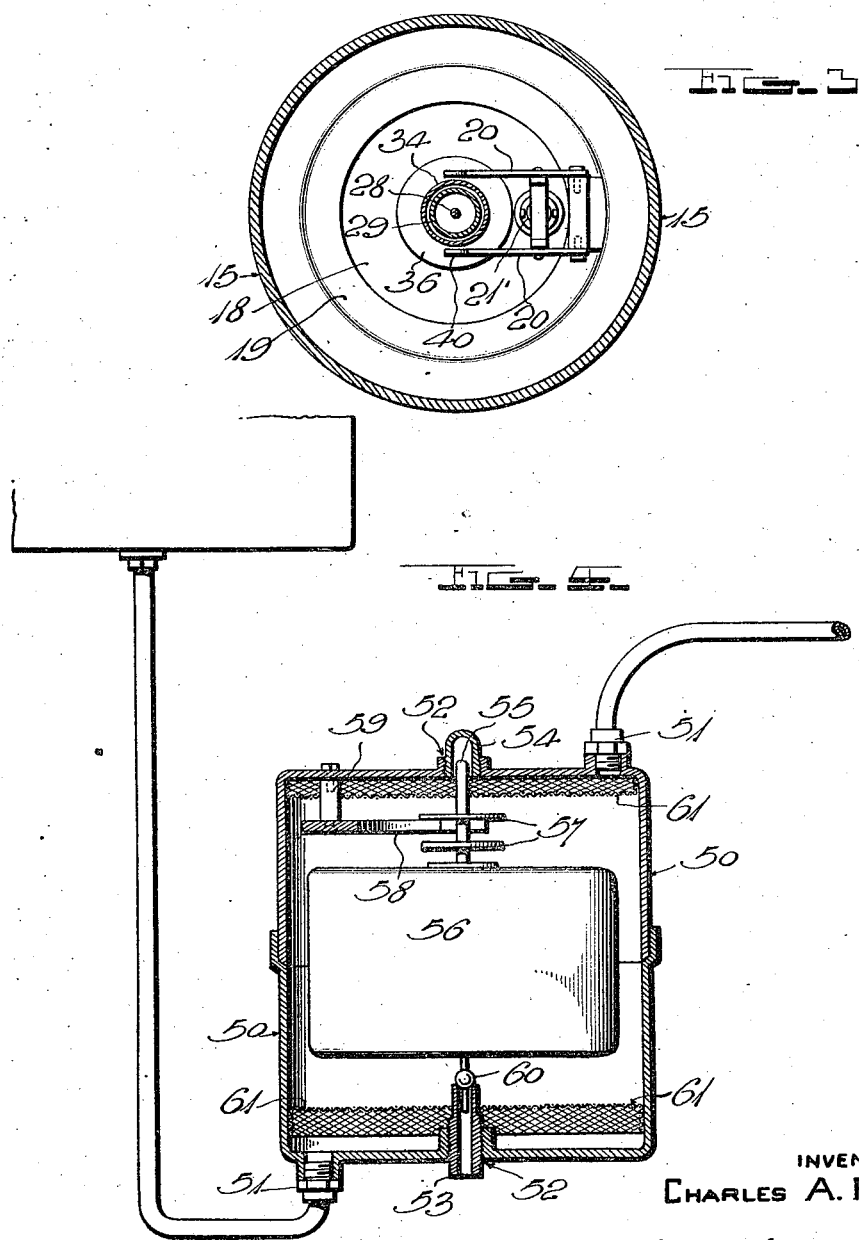
INVENTOR:
CHARLES A. FISHER,
BY H. L. Woodward,
ATTORNEY Patented Nov. 9, 1926.

1,606,356

UNITED STATES PATENT OFFICE.

CHARLES A. FISHER, OF PASCAGOULA, MISSISSIPPI.

LIQUID PURIFICATION AND LIQUID-LEVEL CONTROL.

Application filed October 6, 1924. Serial No. 741,895.

This invention has for an object to effect improvements in fuel feed systems, especially those suited to internal combustion engines. It aims to provide a novel float control means for improving the quality of fuel operative for removing water from the fuel line.

It is a common experience that float valves in motor vehicles—for instance in carburetors—fail to seat with sufficient force to prevent leakage of fuel, and it is known that the vibration of a motor vehicle produces a corresponding action in the float valve thus causing irregularities of flow. The purpose of this invention is to overcome these objections.

The invention resides also in the construction, arrangement and combination of parts involved in its embodiment, and therein are also latent or patent many objects and advantages, which may be understood from the following description and accompanying drawings, wherein—

Figure 1 is a vertical sectional view of the complete appliance.

Fig. 2 is a section on the line 2—2 of Fig. 1.

Figure 3 is a top view of the water valve mounting, as indicated by the line 3—3 of Fig. 1.

Fig. 4 is a view similar to Fig. 1 of a modification of the apparatus.

It should be understood at the outset that this device in its present embodiment does not limit the movement of fuel therethrough positively, except to cut off flow when the apparatus is taken apart.

There is illustrated a fragment of a tank 10, having the usual collar 11 soldered or welded thereto around the outlet, and screwed into this collar is the neck 12 of a bowl top or head 13 which may readily be produced by stamping. This has a cylindrical skirt flange 14 on which there is engaged with a driving fit a bowl body 15 which may be of lighter metal. The bowl is formed with a shoulder 16 which the flange 14 abuts. The bowl is stamped to a suitable form to provide a chamber within which a float may operate as will be described, a cylindrical well 18 being formed in the bottom extending a distance downwardly from the essential chamber part. The bowl immediately at the top of the well is formed with a horizontal ledge 19 upon one side of which a lever 20 is fulcrumed to be operated by the float. Medially of this lever there is pivoted a pendant link 21 having a ball valve 21' at its extremity arranged to engage a ported seat fitting 22 screwed into the bottom of the well at one side. The bottom of the well is formed with a dependant cylindrical sleeve 23 forming the clean-out opening of the bowl. In this sleeve there is slidably fitted a thimble 24 which is formed with an enlarged conical shoulder 25, this shoulder and lower end of the sleeve being ground to a good fit. A bushing 26 is screwed into the neck 12 having a conical seat at the upper end to receive a valve 27, the stem 28 of which extends entirely through the bowl, and projects below the thimble. An inlet tube 29 is screwed into the lower part of the bushing, which tube also extends below the thimble, but stops short of the end of the stem 28. An acorn nut 30 is screwed onto the lower end of the tube 29, the upper face of the nut being conical and engaging a seat on the thimble. The thimble is pressed by the nut to closed relation with the lower edge of the sleeve 23, and the shoulder 16 is forced into sealing engagement with the lower edge of the flange 14 of the head 13. The nut also bears upon the valve stem 28 holding the valve 27 open. In this manner, no gasket or bolts are required for the proper operative assembly of the several parts.

A short distance above the bottom of the well, ports 31 are formed in the tube 29, and a cylindrical screen 32 is fitted tightly but removably in the thimble, around the tube and having its upper end fitted closely around the latter above the ports 31.

A circular metal float 33 is provided in the larger chamber part of the bowl, having an axial tube 34 fixed therein projecting above and below the float and loosely slidable upon the tube 29. Two vertically spaced large soft iron washers or armatures 35 are fixed on the tube 34 at the upper part, one closely over the float and the other at the extremity of the tube 34. Flanges 36 similar to the washers are provided on the tube 34 at the lower side of the float and snugly fitted therebetween are the knobbed ends 40 of the respective elements of the lever 20, which may comprise two side pieces connected by the pivot pins. Thus the lever will be operated in prompt response to movement of the float. The valve 21' will engage its seat before the float reaches the lower limit of its movement so that the full weight of the float will press the valve to its seat, somewhat augmented by a magnet to be described.

A permanent magnet 41 of the horseshoe type is fixedly mounted upon the under side of the head 13, with its poles at opposite sides of the tube 34 and between the flanges of the armatures 35, which are spaced somewhat more than the thickness of the magnet, or such distance as it is desired that the movement of the float shall include. The magnet is mounted by non-magnetic studs 37, or pins, which are tenoned in the magnet and suitably fixed in the head 13. Preferably, the float parts including the tube 34 are also of non-magnetic metal, copper having been employed.

The head is formed with a tapped and threaded boss or outlet 42 in the upper side near the flange 17 from which a feed pipe may be extended to a carburetor.

A circular screen 44 is snugly fitted within the flange 17 at the upper part entirely covering the chamber, being above the armatures and magnet. In the construction of this device a departure from the ordinary practice in the designing of floats is involved. The float is of such weight that it will float in water, but will not float in the fuel. Preferably, the float weighs about 85 per cent of its full displacement of water when submerged. This would make it about 15 per cent heavier than the like displacement of gasoline. In practice, the float will at all times be covered by fuel, and partly supported by water, but not lifted by the water except when an excess of water accumulates in the device.

In the use of the device a quantity of water is introduced into the device either before or after fuel has entered, and this may be accomplished by pouring it directly into the tank 10 in the same manner as fuel for a motor vehicle is introduced. Preferably an excess of water is introduced so that a certain amount will be automatically discharged by the device, and maintenance of a proper amount be assured.

When the water has been introduced, the fuel thereafter admitted being lighter than water will pass upward through the water, being finely divided by the screen 32. Particles heavier than water will settle into the thimble, and those lighter or in suspension will be collected on the screens 32 and 44.

Also, in passing through the water, certain gases having an affinity for water and of no value in combustion are absorbed in the main body of water in the device, while at the same time a certain proportion of water itself is taken up by the fuel.

The elements of the device are of such nature that they may be produced at very low cost, and it may be embodied in a very compact form requiring a minimum of space for its installation, as well as very simple assembly operations in manufacture and the most elementary knowledge and ability for its installation and maintenance.

When it is desired to remove sediment from the thimble 24 the nut 30 is unscrewed, which immediately lowers the valve 27 to closed position preventing further feed of fuels. The thimble is drawn downwardly with its assembled screen, which may be removed and cleaned. If it is desired to remove the other parts, the bowl may, by application of somewhat more force, be removed from the head 13, leaving the entire mechanism of the device exposed and retained on the head 13 except the lever 20 and attached link and valve.

In Figure 3 the device is illustrated in simplified form, in which a bowl 50 is formed in two opposed cup-like similar sections one having its edge fitted within the other. Each is provided with pipe fittings 51 into one of which fuel may be led from the supply tank and from the other of which the fuel is discharged to the carburetor.

Each part of the bowl is formed with an axial opening 52, the opening in the lower section having the ported seat 53, while the similar opening in the upper section has a closed fitting 54 similar to the seat 53 excepting that it is closed, and no valve coacts therewith, and it merely serves as a guide for a stem 55 fixed on the float 56. The stem 55 may be merely secured on the top side of the float, and has two circular armatures 57 suitably spaced, and a permanent magnet 58 is mounted by non-magnetic pins 59 on the head of the upper section. The lower side of the float has mounted thereon a simple ball valve 60 with a stem extending a distance downwardly therefrom, for guidance of the float. Circular screens 61 are fitted in each bowl section near the outer parts.

The use and functioning of the last described structure is in the main the same as that before described.

It should be noted that the float has an extremely limited movement—not more than 1/8 on an inch ordinarily, and it may be even less. But an effect of much greater range of movement of an ordinary float is attained, by reason of the effect of the stationary magnet and the armatures carried by the float. Thus, the float being at the lower limit of movement, and the water valve closed, when the water level reaches a point where the float would be sustained thereby, the magnet prevents it from being jostled so as to cause rattling of the water valve on its seat. It is not until the water level has reached a point considerably higher, that the float finally overcomes the attraction of the magnet for the upper flange of the armature and at that instant the float exerts a much greater buoyancy, causing its rapid movement, and as soon as it has passed a medial point in its movement, the attraction of the lower flange of the armature by the magnet further accelerates the movement of the float until it is checked abruptly by engagement of the lower armature against the magnet. In the same way, when the water is being lowered, the float is sustained in its upper position partly by magnet for a time when the water and fuel displaced are insufficient to buoy the float, but its weight finally overcomes the attraction of the magnet for the lower armature and moves it very rapidly downward to lower position; closing the water valve. Float action of this nature minimizes the movements of the float, and the valve, reduces wear of the valve and its seat, largely eliminates liability of excessive passage of liquid past the float valve when the float is near the point for lifting the valve, and also prevents many small particles from holding the valve unseated. These would be important attainments in carburetors having float feed control.

It may be noted that in the movement of a motor vehicle in which my invention is installed, the valve 27 will normally be jostled about within the tube 34, tending to loosen any particles of matter that may accumulate there and that may tend to choke the tank outlet, either preventing such particles from gaining access to the drain passage, or causing them to pass to the screen in the bowl.

I claim:

A device of the character described comprising a chamber having a liquid inlet and a liquid outlet, a float in the chamber, a valve operatively connected with the float for cooperating with said outlet to control the level of a liquid in the chamber, a magnet, armature elements on opposite sides of the magnet within its field and movable with and fixed on the float, the parts being proportioned whereby the buoyancy of the float at one time and its weight at another time may overcome the attraction of the magnet for the respective armature elements, for movement from one limit of movement to the other.

In testimony whereof I affix my signature.

CHARLES A. FISHER.